US007269944B2

(12) United States Patent
Zhang et al.

(10) Patent No.: US 7,269,944 B2
(45) Date of Patent: Sep. 18, 2007

(54) HYDRAULIC SYSTEM FOR RECOVERING POTENTIAL ENERGY

(75) Inventors: Jiao Zhang, Naperville, IL (US); Pengfei Ma, Naperville, IL (US); Michael Schwab, Crest Hill, IL (US); Kalpesh N. Patel, Romeoville, IL (US); Tonglin Shang, Bolingbrook, IL (US)

(73) Assignees: Caterpillar Inc., Peoria, IL (US); Shin Caterpillar Mitsubishi Ltd. (JP)

( * ) Notice: Subject to any disclaimer, the term of this patent is extended or adjusted under 35 U.S.C. 154(b) by 0 days.

(21) Appl. No.: 11/239,394

(22) Filed: Sep. 30, 2005

(65) Prior Publication Data

US 2007/0074509 A1 Apr. 5, 2007

(51) Int. Cl.
*F16D 31/02* (2006.01)

(52) U.S. Cl. .......................................... 60/414; 60/416

(58) Field of Classification Search .................. 60/414, 60/416, 413

See application file for complete search history.

(56) References Cited

U.S. PATENT DOCUMENTS 4,646,518 A 3/1987 Hochsattel
4,760,697 A 8/1988 Heggie et al.
4,776,541 A * 10/1988 Maynard .................... 244/165
4,928,487 A 5/1990 Nikolaus
5,678,982 A * 10/1997 Schwaiger .................. 60/486
5,743,716 A 4/1998 Smith
5,794,437 A 8/1998 Lisniansky
5,794,442 A 8/1998 Lisniansky
5,916,139 A 6/1999 Tieben
6,434,864 B1 8/2002 Epshteyn
6,584,769 B1 7/2003 Bruun
6,655,136 B2 12/2003 Holt et al.
6,701,822 B2 3/2004 Hajek, Jr. et al.
6,789,387 B2 9/2004 Brinkman
2004/0173396 A1 9/2004 Rush et al.
2005/0196288 A1* 9/2005 Cherney .................. 417/199.1

FOREIGN PATENT DOCUMENTS

JP 07-071409 3/1995

* cited by examiner

*Primary Examiner*—Michael Leslie
(74) *Attorney, Agent, or Firm*—Finnegan, Henderson, Farabow, Garrett & Dunner

(57) ABSTRACT

A hydraulic system may include a hydraulic actuator. The hydraulic system may also include a pump having a pump inlet and a pump outlet, and the pump may be configured to supply fluid to the hydraulic actuator. The hydraulic system may further include an energy recovery system operatively connected between the hydraulic actuator and the pump. The energy recovery system may be configured to store fluid from the hydraulic actuator under an overrunning load condition, and the stored fluid may be directed through the pump inlet and into the hydraulic actuator.

22 Claims, 2 Drawing Sheets

HYDRAULIC SYSTEM FOR RECOVERING POTENTIAL ENERGY

TECHNICAL FIELD

The present disclosure relates to energy recovery, and more particularly to a system and method for recovering potential energy of a linkage system using a hydraulic circuit.

BACKGROUND

A work machine may be used to move heavy loads, such as earth, construction material, and/or debris, and may include, for example, a wheel loader, an excavator, a front shovel, a bulldozer, a backhoe, and a telehandler. The work machine may utilize a work implement to move the heavy loads. The work implement of the work machine may be powered by a hydraulic system that may use pressurized fluid to actuate a hydraulic actuator to move the work implement.

During operation of the work machine, the implement may be raised to an elevated position. As the implement may be relatively heavy, the implement may gain potential energy when raised to the elevated position. As the implement is released from the elevated position, this potential energy may be converted to heat when pressurized hydraulic fluid is forced out of the hydraulic actuator and is throttled across a valve and returned to a tank. Typically, the conversion of potential energy into heat may result in an undesired heating of the discharged hydraulic fluid, which may require that the work machine possess additional cooling capacity. Recovering that lost or wasted potential energy for reuse may improve work machine efficiency.

One system designed to recover or recycle the energy associated with lowering a load is disclosed in U.S. Pat. No. 6,584,769 to Bruun ("Bruun"). Bruun discloses a hydraulic circuit including a hydraulic machine, the flow of which can be routed to the rod end of a double acting hydraulic cylinder. The hydraulic circuit also includes a variable hydraulic machine, a servo pump, and an accumulator. During operation, pressurized oil in the accumulator flows through a bi-directional pump of the variable hydraulic machine, which then conveys the oil to the lifting cylinder. In the event of a lowering movement, the direction of flow in the bi-directional pump is changed and oil is supplied to the accumulator. A disadvantage associated with the hydraulic circuit in Bruun is that it requires a bi-directional pump and a servo pump to perform the functions of extending and retracting the double acting hydraulic cylinder and recovering or recycling the energy resulting from the lowered load. The use of these components increases the complexity, size, and cost of the hydraulic circuit in Bruun.

The system of the present disclosure is directed towards overcoming one or more of the constraints set forth above.

SUMMARY OF THE INVENTION

In one aspect, the present disclosure may be directed to a hydraulic system. The hydraulic system may include a hydraulic actuator and a pump having a pump inlet and a pump outlet. The pump may be configured to supply fluid to the hydraulic actuator. The hydraulic system may also include an energy recovery system operatively connected between the hydraulic actuator and the pump. The energy recovery system may be configured to store pressurized fluid from the hydraulic actuator under an overrunning load condition. The stored fluid may be directed through the pump inlet and into the hydraulic actuator.

In another aspect, the present disclosure may be directed to a method for recovering energy in a hydraulic circuit including a pump. The method may include directing a fluid exiting from a hydraulic actuator into an energy recovery system under an overrunning load condition without circulating the fluid through the pump. The method may also include storing the fluid in the energy recovery system and releasing the stored fluid into an inlet of the pump.

In yet another aspect, the present disclosure may be directed to a work machine. The work machine may include a work implement, and a hydraulic circuit configured to actuate the work implement. The work implement may include a hydraulic actuator, a pump configured to supply fluid to the hydraulic actuator, and an energy recovery system. The energy recovery system may be configured to directly receive the fluid from the hydraulic actuator under an overrunning load condition without circulating the fluid through the pump, and recirculate fluid into an inlet of the pump.

DETAILED DESCRIPTION

Figure 1:
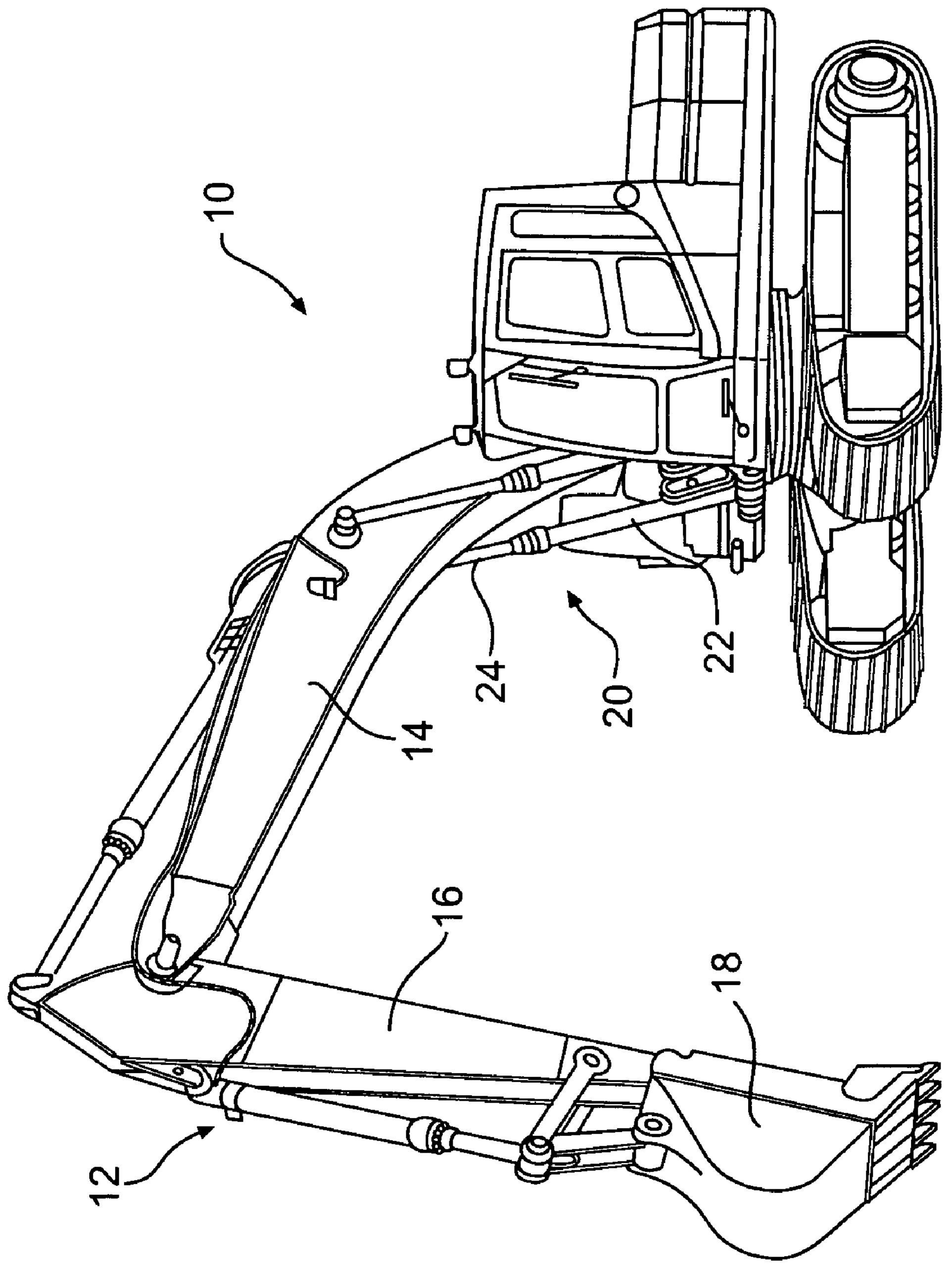
FIG. 1 provides a diagrammatic view of a work machine according to an exemplary disclosed embodiment.

FIG. 1 shows an exemplary work machine 10. Work machine 10 may include, for example, an excavator, loader, or any machine having a hydraulically powered work implement 12. In one embodiment, implement 12 may include a boom 14, a stick 16, and a bucket 18. Operations performed by implement 12 may include, for example, lifting, lowering, and otherwise moving a load (not shown).

Implement 12 may be moved to perform its various functions by one or more hydraulic actuators 20. Hydraulic actuator 20 may include any device configured to receive pressurized hydraulic fluid and convert it into a mechanical force and motion. For example, hydraulic actuator 20 may include a fluid motor or hydrostatic drive train. Additionally or alternatively, hydraulic actuator 20 may include a double acting hydraulic cylinder embodied by a housing 22 and a piston 24. Elements of hydraulic actuator 20, one known in the art, may be seen in greater detail in FIG. 2.

Housing 22 may include a vessel having an inner surface 26. In one embodiment, housing 22 may include a substantially cylindrically-shaped vessel having a cylindrical bore therein defining inner surface 26. It is contemplated that piston 24 may be closely and slidably received against inner surface 26 of housing 22 to allow relative movement between piston 24 and housing 22.

Piston 24 may include a plug 28 shaped to fit closely against inner surface 26 of housing 22. Piston may also include a rod 30 connected on one end to plug 28 and connected on another end directly or indirectly to work implement 12. Piston 24 may divide the internal chamber of housing 22 into a rod end chamber 34 corresponding to the portion of the internal chamber on the rod side of piston 24, and a head end chamber 32 corresponding to the portion of the internal chamber opposite to the rod side. Housing 22 may include a head end aperture 36 associated with head end chamber 32 and a rod end aperture 38 associated with rod end chamber 34. Pressurized hydraulic fluid may flow into and out of head and rod end chambers 32, 34 to create a pressure differential between them that may cause movement of piston 24.

A hydraulic circuit or system 40 may be utilized to selectively direct pressurized hydraulic fluid into and out of hydraulic actuator 20. In one embodiment, hydraulic circuit 40 may include a tank 42, a pump 44, a cylinder control valve assembly 46, an energy recovery system 48, and a bypass valve 50.

Tank 42 may include a source of low pressure hydraulic fluid, such as, for example, a fluid reservoir. The fluid may include a dedicated hydraulic oil, an engine lubrication oil, a transmission lubrication oil, or other suitable working fluid. Hydraulic circuit 40 may selectively draw fluid from and return fluid to tank 42 during operation of implement 12. Although only a single tank 42 is shown, it is also contemplated that hydraulic circuit 40 may be in fluid communication with multiple, separate fluid tanks (not shown).

Pump 44 may be configured to produce a flow of pressurized hydraulic fluid, and may include, for example, a piston pump, gear pump, vane pump, or gerotor pump. Pump 44 may have a variable displacement capacity, or, in the alternative, a fixed capacity for supplying the flow. Pump 44 may include a pump inlet 52 and a pump outlet 54, wherein pump inlet 52 may be connected to tank 42 by a fluid line 56. In operation, pump 44 may draw hydraulic fluid from tank 42 at ambient or low pressure and may work the hydraulic fluid to pressurize it. The pressurized hydraulic fluid flow may exit through pump outlet 54. It is contemplated that pump 44 may be a one-way pump.

In order to ensure the ability of suction with respect to pump 44, and to lessen the work load and/or energy expenditure associated with drawing the hydraulic fluid and working it into the pressurized state, hydraulic circuit 40 may also include a charge pump 58. Charge pump 58 may assist pump 44 by pressurizing hydraulic fluid from tank 42 and supplying that pressurized hydraulic fluid to pump inlet 52. Less work and/or energy may be required from pump 44 to pressurize the hydraulic fluid once it has been pre-pressurized by charge pump 58.

Pump 44 and/or charge pump 58 may be drivably connected to a power supply (not shown) of work machine 10 by a countershaft, a belt, an electrical circuit, and/or in any other suitable manner. Pump 44 and/or charge pump 58 may be dedicated to supplying pressurized hydraulic fluid only to hydraulic circuit 40, or alternatively, pump 44 and/or charge pump 58 may supply pressurized hydraulic fluid to hydraulic circuit 40 and additional hydraulic systems (not shown) of work machine 10.

Cylinder control valve assembly 46 may include an independent metering valve unit, including two pump-to-cylinder ("P-C") independent metering control valves 60 and 62 and two cylinder-to-tank ("C-T") independent metering control valves 64 and 66. P-C and C-T independent metering control valves 60, 62, 64, and 66 may each be independently actuated into open and closed conditions, and positions in between open and closed. Through selective actuation of P-C and C-T control valves 60, 62, 64, and 66, pressurized hydraulic fluid may be directed into and out of head end and rod end chambers 32 and 34 of hydraulic actuator 20. By controlling the direction and rate of fluid flow to and from head end and rod end chambers 32 and 34, P-C control valves 60 and 62 and C-T control valves 64 and 66 may control the motion of implement 12. Additionally or alternatively, cylinder control valve assembly 46 may include one or more single spool valves (not shown), proportional control valves, or any other suitable devices configured to control the rate of pressurized hydraulic fluid flow entering into and exiting out of hydraulic actuator 20.

P-C control valves 60 and 62 may be configured to direct pressurized hydraulic fluid exiting from pump outlet 54 into hydraulic actuator 20. In particular, P-C control valve 62 may selectively direct hydraulic flow into rod end chamber 34 of hydraulic actuator 20, while P-C control valve 60 may perform a similar function with regard to head end chamber 32.

C-T control valves 64 and 66 may be configured to receive hydraulic fluid exiting from head and rod end chambers 32 and 34 of hydraulic actuator 20. In particular, C-T control valve 64 may receive hydraulic fluid leaving head end chamber 32 and direct it towards tank 42. C-T control valve 66 may perform a similar function with regard to rod end chamber 34 and tank 42. C-T control valves 64 and 66, like P-C control valves 60 and 62, may include various types of independently adjustable valve devices.

Energy recovery system 48 may recover energy associated with pressurized hydraulic fluid discharged from hydraulic actuator 20. For example, energy recovery system 48 may recover energy when hydraulic actuator 20 is under an overrunning load condition. An overrunning load condition may exist wherein retraction is desired after hydraulic actuator 20 has been extended to lift a load. In the overrunning load condition, hydraulic actuator 20 may be retracted by the force of gravity on implement 12 and/or the force of gravity on the load carried by implement 12. This retraction may cause movement of piston 24 in the direction of head end chamber 32, thus resulting in pressurized hydraulic fluid being forced out of head end chamber 32. This overrunning load condition may be distinguished from a resistive load condition where hydraulic actuator 20 must work against the weight of implement 12 and/or the force of gravity on the load to perform a movement or operation.

In one exemplary disclosed embodiment, energy recovery system 48 may include a high-pressure ("HP") accumulator 68, a HP charge valve 70, a HP discharge valve 72, a tank accumulator 74, a check valve 76, a back pressure valve 78, and another check valve 82. The energy recovered by energy recovery system 48 may be used to provide power for subsequent movements and operations of hydraulic actuator 20 and other hydraulic devices present on work machine 10.

HP accumulator charge valve 70 may be located on a fluid line 80 that may be operatively connected to head end chamber 32 and HP accumulator 68. In the resistive load condition, HP accumulator charge valve 70 may be in a closed position to prevent entry of pressurized hydraulic fluid exiting head end chamber 32 into HP accumulator 68. In the overrunning load condition, HP accumulator charge valve 70 may be actuated to an open position while C-T control valve 64 may be actuated to a closed position, thus allowing pressurized hydraulic fluid exiting head end chamber 32 to enter HP accumulator 68 through fluid line 80. It is further contemplated that HP accumulator charge valve 70 may work in conjunction with a check valve 82, also located on fluid line 80, such that when HP accumulator charge valve 70 is in the open position, check valve 82 may allow pressurized hydraulic fluid to flow from head end chamber 32 to HP accumulator 68, but not in the reverse direction.

As the amount of pressurized hydraulic fluid within HP accumulator 68 increases so may the pressure within HP accumulator 68, thus making it more difficult for pressurized hydraulic fluid to travel from head end chamber 32 to HP accumulator 68. Once the pressure within HP accumulator 68 equals the pressure within head end chamber 32, the pressurized hydraulic fluid may stop flowing from head end chamber 32 to HP accumulator 68. The pressurized hydraulic fluid may hold hydraulic actuator 20 in its current position, allowing HP accumulator 68 to act as a spring or shock absorber by reducing the amount of "bounce" of implement 12 as work machine moves over uneven surfaces at a job site. Additionally or alternatively, if continued movement of hydraulic actuator 20 is desired, pump 44 may supply pressurized hydraulic fluid into rod end chamber 34 of hydraulic actuator 20 to increase the pressure within head end chamber 32 by driving piston 24 in the direction of head end chamber 32. As such, the pressure in head end chamber 32 may be consistently maintained at a level greater than the pressure within HP accumulator 68 and piston 24 may function smoothly in the overrunning load condition without experiencing a stoppage.

HP accumulator discharge valve 72 may be located on fluid line 80 in a position between HP accumulator 68 and pump 44, and may selectively place HP accumulator 68 into fluid communication with pump 44. In the overrunning load condition, HP accumulator discharge valve 72 may be in a closed position, thus causing pressurized hydraulic fluid exiting from head end chamber 32 to accumulate within HP accumulator 68. When movement of hydraulic actuator 20 may once again be desired, HP accumulator discharge valve 72 may shift to an open position, thus creating a flow path between HP accumulator 68 and pump 44, such that pressurized hydraulic fluid in HP accumulator 68 may be supplied to pump inlet 52 to charge pump 44 and help to perform the desired movement.

Tank accumulator 74 may be operatively connected to rod end chamber 34 by a fluid line 84. Hydraulic fluid at low pressure exiting from rod end chamber 34 may be stored in tank accumulator 74 for reuse at a later time. Tank accumulator 74 may operate in conjunction with check valve 76 and back pressure valve 78 to supply pressurized hydraulic fluid to pump 44 when desired.

Check valve 76 may be disposed in fluid line 56 to permit passage of hydraulic fluid in a single direction. In one contemplated embodiment, check valve 76 may include a biasing device 86, such as a spring, configured to create a biasing pressure that may urge check valve 82 into the closed position. When HP accumulator discharge valve 72 opens to release the pressurized hydraulic fluid stored within HP accumulator 68, that pressurized hydraulic fluid may create a first fluid pressure at pump inlet 52 and at check valve 76. Check valve 76 may remain closed due to a combined force exerted by the first fluid pressure and the biasing pressure. As the pressurized hydraulic fluid exits from HP accumulator 68, the corresponding change in pressure within HP accumulator 68 may be sensed by a pressure sensor (not shown), which may be mounted, for example, on or in HP accumulator 68 or at the juncture where HP accumulator 68 connects to fluid line 80. When the amount of pressurized hydraulic fluid in HP accumulator 68 falls to a predetermined level or is completely exhausted, the sensor may trigger the closing of HP accumulator discharge valve 72. When HP accumulator discharge valve 72 closes, the combined force exerted by the first fluid pressure and the biasing pressure may become less than an opposing force in the opening direction of check valve 76 generated by the pressure exerted by the pressurized hydraulic fluid stored in tank accumulator 74. Accordingly, check valve 76 may open to allow the pressurized hydraulic fluid in tank accumulator 74 to escape towards pump 44.

Back pressure valve 78 may include a check valve 88 having a biasing device 90 similar to check valve 76. However, back pressure valve 78 may be disposed on fluid line 56 so as to allow passage of pressurized hydraulic fluid back into tank 42. As such, back pressure valve 78 may regulate the pressure of pressurized hydraulic fluid stored within tank accumulator 74. For example, as previously described, pressurized hydraulic fluid leaving rod end chamber 34 may be directed into fluid line 84, through C-T independent metering valve 66, and towards tank accumulator 74, thus creating pressure within tank accumulator 74 as pressurized hydraulic fluid is stored therein. As long as the pressure in tank accumulator 74 remains below a predetermined pressure required to force back pressure valve 78 to an open position, tank accumulator 74 may continue to store more pressurized hydraulic fluid and the pressure in tank accumulator 74 may continue to steadily increase. However, once the pressure within tank accumulator 74 exceeds the predetermined pressure, back pressure valve 78 may be forced into an open position, thus allowing the pressurized hydraulic fluid within tank accumulator 74 to escape to tank 42. Once enough fluid leaves tank accumulator 74 to cause the pressure within tank accumulator 74 to fall back below the predetermined pressure, then back pressure valve 78 may return to its closed position due to a biasing pressure exerted by biasing device 90. Thus, excess flow in tank accumulator 74 may return to tank 42 so that the pressure within tank accumulator 74 may be consistently maintained at or below the predetermined pressure level. It is contemplated that the predetermined pressure level may be adjusted by adjusting the biasing pressure exerted by biasing device 90.

During operation of work machine 10, hydraulic actuator 20 may be repeatedly extended and retracted to raise and lower implement 12. Between movements, hydraulic actuator 20 may be at rest. However, pump 44 may continue to run and pump out a minimal flow of pressurized hydraulic fluid during these periods of rest in preparation for subsequent movements. Bypass valve 50 may be configured to direct the flow of hydraulic fluid from pump 44 towards tank accumulator 74 and/or tank 42 during rest periods when movement of hydraulic actuator 20 is not desired. Then, when movement of hydraulic actuator is once again desired, that minimal flow of pressurized hydraulic fluid may be directed immediately from pump 44 to hydraulic actuator 20 simply by moving bypass valve 50 to a closed position. Thus, pressurized hydraulic fluid may be supplied, at least initially, with only minor stress on pump 44.

INDUSTRIAL APPLICABILITY

Figure 2:
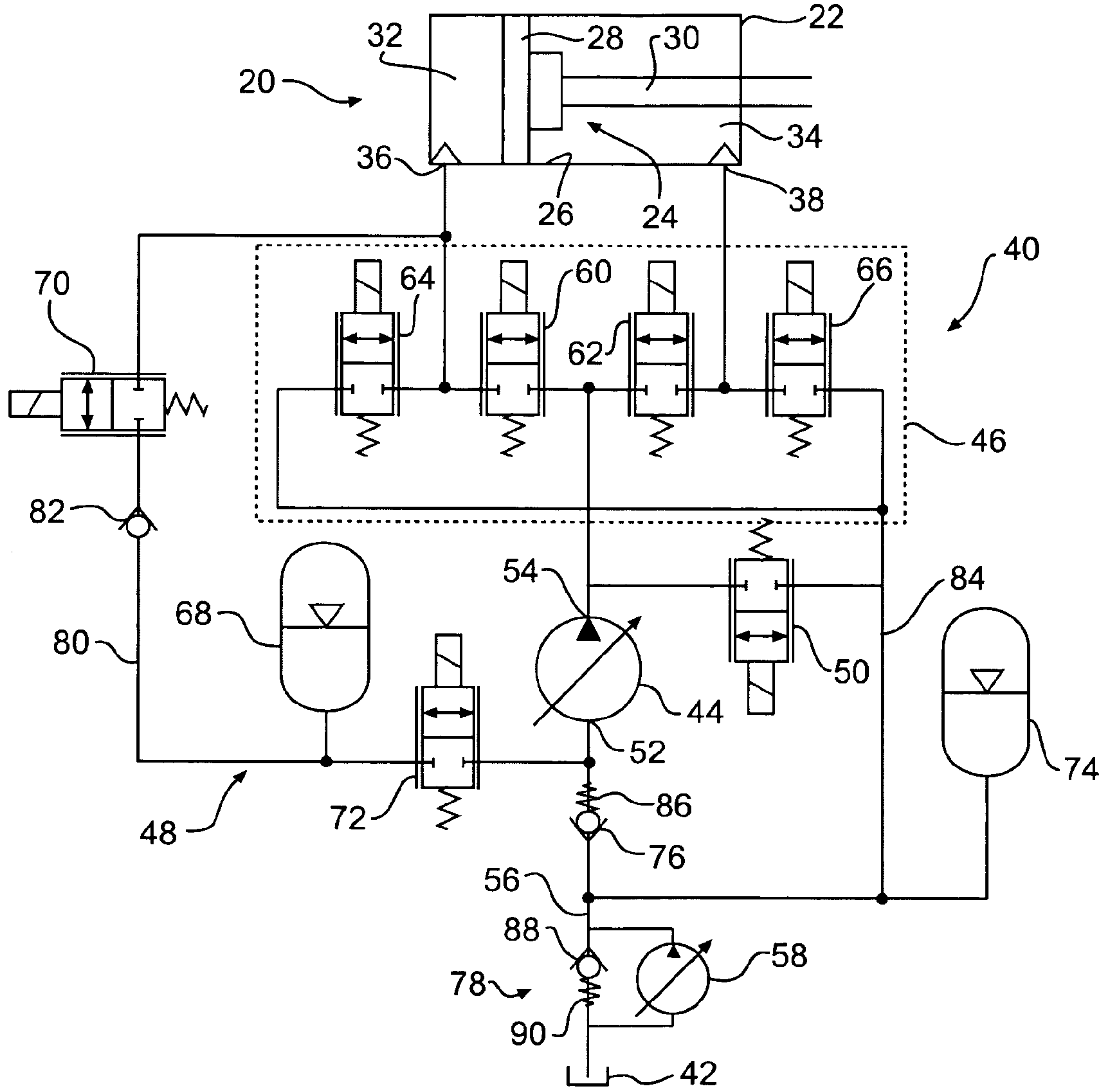
FIG. 2 provides a schematic view of a hydraulic system according to an exemplary disclosed embodiment.

The disclosed energy recover system may have particular applicability with work machines. In particular, and as shown in FIG. 2, energy recovery system 48 may serve to recover and/or recycle potential energy associated with movement of an implement 12 operatively connected to a hydraulic actuator 20.

The act of extending hydraulic actuator 20 to raise implement 12 of work machine 10 may include opening a pump-to-cylinder ("P-C") independent metering control valve 60 to allow the entry of pressurized hydraulic fluid, provided by a pump 44, into a head end chamber 32 of hydraulic actuator 20. A cylinder to tank ("C-T') independent metering control valve 66 may also open, allowing pressurized hydraulic fluid in a rod end chamber 34 of hydraulic actuator 20 to escape. Thus, a pressure differential may be created wherein the pressure of pressurized hydraulic fluid within head end chamber 32 may exceed the pressure of pressurized hydraulic fluid within rod end chamber 34. The pressure differential may drive a piston 24 of hydraulic actuator 20 in the direction of rod end chamber 34. As pressurized hydraulic fluid exits from rod end chamber 34, it may be directed towards a tank accumulator 74 through a fluid line 84. Tank accumulator 74 may store the pressurized hydraulic fluid and the energy associated therewith.

Retraction of hydraulic actuator 20 to lower implement 12 from a raised position may be driven by the force of gravity acting on raised implement 12 and/or the force of gravity on the load carried by implement 12. Those forces may act on piston 24 to push pressurized hydraulic fluid out of head end chamber 32. That pressurized hydraulic fluid may then be directed into a HP accumulator 68, where it may be stored.

The stored pressurized hydraulic fluid in HP accumulator 68 may be directed back towards hydraulic actuator 20 to be used in subsequent movements of implement 12. As the stored pressurized hydraulic fluid within HP accumulator 68 is used up, the pressure within HP accumulator 68 may drop accordingly. When the pressure within HP accumulator 68 falls below a predetermined level, a pressure sensor (not shown) associated with HP accumulator 68 may close a HP accumulator discharge valve 72 located between HP accumulator 68 and pump 44. Due to the closing of HP accumulator discharge valve 72, pressure at a pump inlet 52 of pump 44 may be incapable of preventing stored pressurized hydraulic fluid within tank accumulator 74 from moving a check valve 82 in the opening direction. Thus, the pressurized fluid in tank accumulator 74 may escape towards pump 44, allowing tank accumulator 74 to assist pump 44 once the pressurized hydraulic fluid in HP accumulator 68 nears depletion.

This arrangement may be beneficial for a number of reasons. One reason is that tank accumulator 74 may help to ensure that pump 44 may not experience suction problems even when the pressurized hydraulic fluid within HP accumulator 68 is depleted. For example, suppose implement 12 is raised to a first height, and then lowered to a height at or near ground level from that first height. The change in height of implement 12 may result in energy, in the form of pressurized hydraulic fluid, being stored in HP accumulator 68. The amount of energy stored may be substantially equivalent to the potential energy loss resulting from movement of implement 12 from the first height to the ground, which may be substantially equivalent to the energy required to raise implement 12 from the ground back to the first height. If the operator desires to lift implement 12 to a second height higher than the first height, HP accumulator 68 alone may not be capable of supplying enough pressurized hydraulic fluid because HP accumulator 68 may possess only enough pressurized hydraulic fluid to lift implement 12 to a height at or near the first height. In this scenario, tank accumulator 74 may provide pressurized hydraulic fluid to pump inlet 44 to ensure that pump 44 may not encounter suction problems associated with drawing hydraulic fluid from a tank at atmospheric pressure.

Another benefit of arranging tank accumulator 74 to supplement HP accumulator 68 may be evident in a situation where pump 44 may supply pressurized hydraulic fluid to other hydraulically activated devices besides hydraulic actuator 20. In this scenario, pressurized hydraulic fluid stored within HP accumulator 68 may be used by the other hydraulic devices, thus diminishing the available supply of stored pressurized hydraulic fluid for use by hydraulic actuator 20. The arrangement may allow tank accumulator 74 to also provide stored pressurized hydraulic fluid to pump 44, in effect making up for the diminished supply of pressurized hydraulic fluid in HP accumulator 68.

Thus, energy recovery system 48 may provide for the recovery and/or reuse of energy by capturing the energy which was previously throttled to tank and lost as heat, and by storing the energy in pump and tank accumulators 68 and 74. Then, when an operator desires to once again raise implement 12 by extending hydraulic actuator 20, the stored energy, in the form of pressurized hydraulic fluid, may be recirculated to assist pump 44. This reuse of energy may improve work machine efficiency and reduce fuel costs and overall operating costs.

Furthermore, energy recovery system 48 may provide for energy recovery using a simple hydraulic system. In particular, energy recovery system 48 may require only the addition of a few control valves and accumulators, rather than other expensive additional hardware, such as bidirectional pump assemblies, complicated valve devices, or extremely large accumulators. Additionally, due to its simplicity, energy recovery system 48 may be retrofitted with relative ease on the hydraulic systems of a wide variety of previously known work machines.

It will be apparent to those skilled in the art that various modifications and variations can be made in the disclosed system and method without departing from the scope of the disclosure. Additionally, other embodiments of the disclosed system and methods will be apparent to those skilled in the art from consideration of the specification. It is intended that the specification and examples be considered as exemplary only, with a true scope of the disclosure being indicated by the following claims and their equivalents.

What is claimed is:

1. A hydraulic system, comprising:

a hydraulic actuator;

a pump having a pump inlet and a pump outlet, the pump configured to supply fluid to the hydraulic actuator;

an energy recovery system operatively connected between the hydraulic actuator and the pump, the energy recovery system including a first accumulator and a second accumulator;

wherein the first accumulator is configured to store fluid from the hydraulic actuator under a first condition, and the stored fluid is directed through the pump inlet and into the hydraulic actuator; and wherein the second accumulator is configured to receive fluid from the hydraulic actuator under a second condition different than the first condition.

2. The system of claim 1, wherein the energy recovery system further includes a charge valve configured to place the hydraulic actuator into fluid communication with the first accumulator under the first condition.

3. The system of claim 2, wherein the energy recovery system further includes a discharge valve configured to place the first accumulator into fluid communication with the pump inlet.

4. The system of claim 3, further including:

a first fluid line configured to direct fluid from the pump outlet to the hydraulic actuator;

a second fluid line configured to direct fluid from the hydraulic actuator to the first accumulator; and a third fluid line configured to direct fluid from the first accumulator to the pump inlet.

5. The system of claim 2, wherein the energy recovery system further includes a check valve configured to selectively place the second accumulator into fluid communication with the pump inlet under a third condition.

6. The system of claim 5, wherein the third condition corresponds to pressure at the pump inlet being below a predetermined level.

7. The system of claim 5, wherein the hydraulic actuator is a double acting hydraulic cylinder including a head end and a rod end.

8. The system of claim 7, wherein the second accumulator is configured to receive fluid from the rod end.

9. The system of claim 7, wherein the first accumulator is configured to receive fluid from the head end.

10. The system of claim 1, further including a control valve assembly connected with the pump and the second accumulator, wherein the control valve assembly is configured to control the rate of fluid entering and exiting the hydraulic actuator.

11. The system of claim 1, further including a tank configured to provide fluid to the pump and to receive fluid from the hydraulic actuator.

12. A method for recovering energy in a hydraulic circuit including a pump, the method comprising:

directing a fluid exiting from a hydraulic actuator into a first accumulator of an energy recovery system under a first condition without circulating the fluid through the pump, directing the fluid exiting from the hydraulic actuator into a second accumulator of the energy recovery system under a second condition different than the first condition;

storing the fluid in the energy recovery system; and releasing the stored fluid into an inlet of the pump.

13. The method of claim 12, wherein the hydraulic actuator is a double acting hydraulic cylinder including a head end and a rod end, and the fluid enters the first accumulator from the head end.

14. The method of claim 13, wherein the fluid enters the second accumulator from the rod end.

15. The method of claim 14, further including directing the stored fluid from the second accumulator into the pump when a pressure in the first accumulator falls below a predetermined value.

16. A machine comprising:

a work implement;

a hydraulic circuit configured to actuate the work implement, including:

a hydraulic actuator, and a pump configured to supply fluid to the hydraulic actuator; and an energy recovery system, including a first accumulator and a second accumulator;

wherein the first accumulator is configured to directly receive the fluid from the hydraulic actuator under a first condition without circulating the fluid through the pump, and recirculate fluid into an inlet of the pump; and wherein the second accumulator is configured to receive the fluid from the hydraulic actuator under a second condition different than the first condition.

17. The machine of claim 16, wherein the energy recovery system further includes a charge valve configured to selectively place the hydraulic actuator into fluid communication with the first accumulator under the first condition.

18. The machine of claim 17, wherein the energy recovery system further includes a discharge valve configured to selectively place the first accumulator into fluid communication with the pump.

19. The machine of claim 18, wherein the energy recovery system further includes a check valve configured to selectively place the second accumulator into fluid communication with the pump.

20. The machine of claim 19, wherein the check valve places the second accumulator into fluid communication with the pump when a pressure in the first accumulator is below a predetermined value.

21. The machine of claim 16, wherein the pump is a one-way pump.

22. A hydraulic system, comprising:

a hydraulic actuator;

a pump having a pump inlet and a pump outlet, the pump configured to supply fluid to the hydraulic actuator;

an energy recovery system operatively connected between the hydraulic actuator and the pump, the energy recovery system including:

a first accumulator, a charge valve configured to place the hydraulic actuator into fluid communication with the first accumulator, a second accumulator, and a check valve configured to selectively place the second accumulator into fluid communication with the pump inlet; and wherein the stored fluid is directed through the pump inlet and into the hydraulic actuator.

* * * * *